(12) United States Patent
Gilbert

(10) Patent No.: US 6,373,349 B2
(45) Date of Patent: Apr. 16, 2002

(54) RECONFIGURABLE DIPLEXER FOR COMMUNICATIONS APPLICATIONS

(75) Inventor: Roland A. Gilbert, Milford, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 09/809,449

(22) Filed: Mar. 15, 2001

Related U.S. Application Data

(60) Provisional application No. 60/190,210, filed on Mar. 17, 2000.

(51) Int. Cl.[7] .............................................. H01P 1/213
(52) U.S. Cl. ...................................... 333/126; 333/134
(58) Field of Search ................................... 333/126, 134

(56) References Cited

U.S. PATENT DOCUMENTS 5,023,866 A * 6/1991 DeMuro ...................... 370/24
5,892,419 A * 4/1999 Kotanen et al. ............ 333/202

* cited by examiner

*Primary Examiner*—Justin P. Bettendorf
*Assistant Examiner*—Dean Takaoka
(74) *Attorney, Agent, or Firm*—Salzman & Levy

(57) ABSTRACT

The present invention provides a reconfigurable diplexer which is well suited for use with mulitple element antenna arrays. The diplexer includes a common, slot-line transmission line adapted to carry electromagnetic signals; a pair a separate slot-line transmission lines coupled to the common transmission line; each separate slot-line transmission line having an individual filter coupled thereto, wherein each filter is adapted to selectively give its respective separate slot-line transmission line a characteristic impedance dependent upon predetermined frequencies of the electromagnetic signals; and a separate slot-line balun associated with each separate slot-line transmission line and adapted for coupling signals to and/or from its respective separate slot-line transmission line. The diplexer may be configured to operate in several different bands such as the INTELSAT frequencies (7.2–8.4 GHz) or DSCS frequencies (11.7–14.5 GHz).

11 Claims, 1 Drawing Sheet

Figure 1:
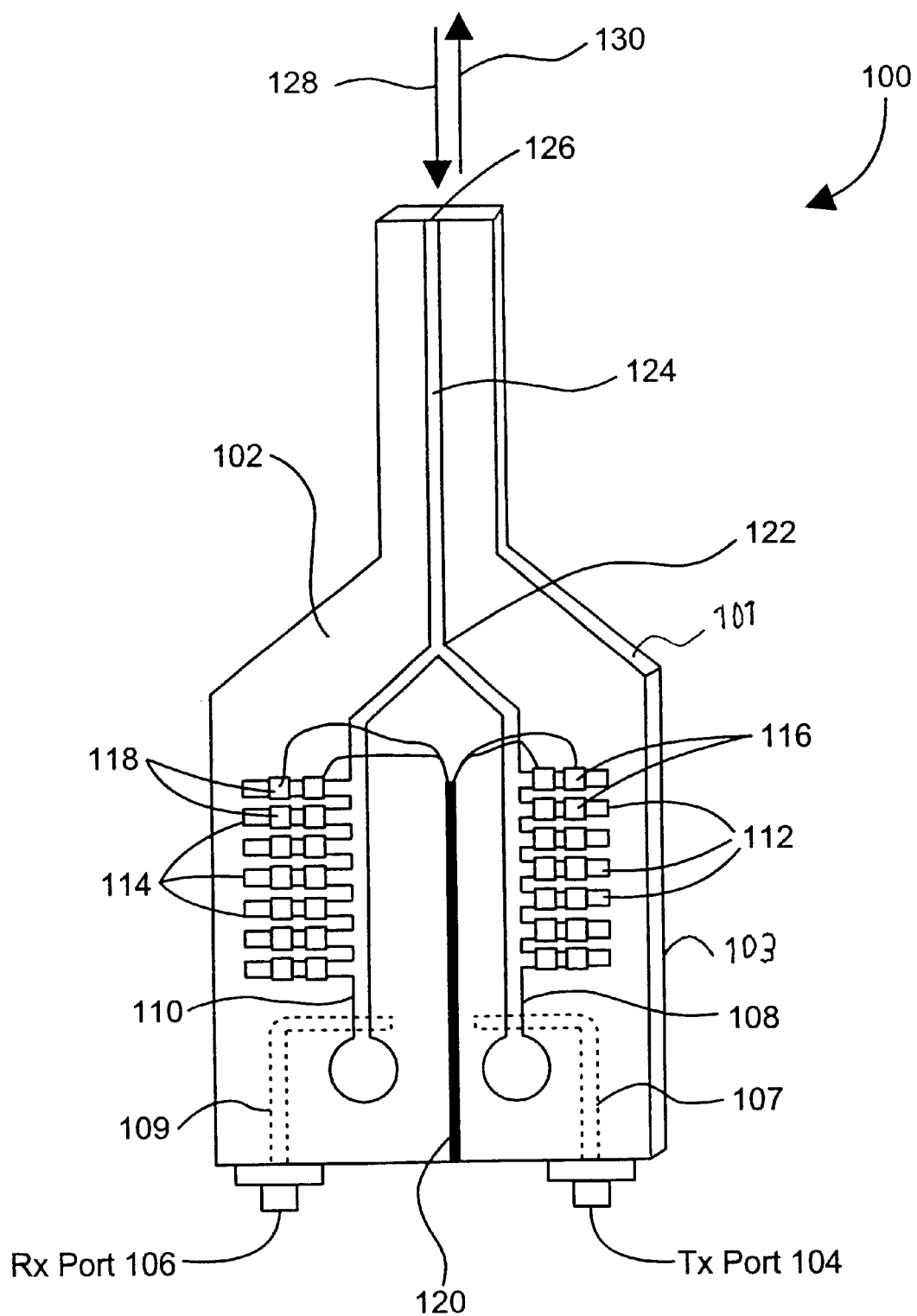

RECONFIGURABLE DIPLEXER FOR COMMUNICATIONS APPLICATIONS

RELATED APPLICATION

This application claims priority from United States Provisional Patent Application Ser. No. 60/190,210 filed Mar. 17, 2000.

FIELD OF THE INVENTION

The present invention relates to diplexers for full duplex communication and, more specifically, to a reconfigurable, tunable, band-selectable diplexer which may be integrated directly with the antenna elements and feed networks of an array antenna that may be used for simultaneous transmission and reception.

BACKGROUND OF THE INVENTION

High data rate, communications systems, both military and commercial, generally operate in a full duplex communications mode. A diplexer is typically used in a satellite dish antenna to separate the transmit and receive frequencies so that the transmit channel does not overpower or saturate the receive channel. These diplexers are expensive, bulky filters. Moreover, it is not practical to place one behind every antenna element in a large phased array antenna.

An interference problem arises when both transmission and reception are required simultaneously. One solution to this problem has been to utilize separate antenna arrays for reception and transmission. This solution provides adequate isolation between received (Rx) signals and transmitted (Tx) signals but requires extra space to implement two arrays. In addition, this approach is also expensive. The cost of a full duplex antenna array could be reduced if some filtering and/or channel isolation could be implemented in the antenna elements themselves. These additions to the antenna structure, combined with the addition of simple filters at the transmitter and receiver themselves, could provide lower-cost, full duplex antenna arrays with the necessary channel separation and isolation.

It is therefore an object of the invention to provide a reconfigurable, tunable diplexer for use in communications antenna systems.

It is a further object of the invention to provide a reconfigurable, tunable diplexer for use in antenna systems, which may selectively operate in more than one communications band.

It is another object of the invention to provide a reconfigurable diplexer for use in antenna systems which includes a tunable, multi-pole comb filter.

It is another object of the invention to provide a reconfigurable diplexer for use in antenna systems which incorporates a slot-line balun.

It is a still further object of the invention to provide a reconfigurable diplexer for use in antenna systems which provides 50 dB of isolation between transmit and receive ports.

It is yet another object of the invention to provide a reconfigurable diplexer for use in dual-beam or multi-beam antenna array systems which operates substantially equivalently in at least two different, predefined frequency bands.

SUMMARY OF THE INVENTION

In accordance with the present invention there is provided a reconfigurable, tunable diplexer, which includes a slot-line balun. In one embodiment, the diplexer includes a common, slot-line transmission line adapted to carry electromagnetic signals; a pair a separate slot-line transmission lines coupled to the common transmission line; each separate slot-line transmission line having an individual filter coupled thereto, wherein each filter is adapted to selectively give its respective separate slot-line transmission line a characteristic impedance dependent upon predetermined frequencies of the electromagnetic signals; and a separate slot-line balun associated with each separate slot-line transmission line and adapted for coupling signals to and/or from its respective separate slot-line transmission line.

The inventive diplexer may be configured to operate in several different bands by configuring resonant cavities. Typically, selective operation in either the International Telecommunications Satellite Organization (INTELSAT) frequencies (13.5–14.5 GHz uplink, 11.7–12.5 GHz downlink) or Defense Satellite Communication System (DSCS) frequencies (7.8–8.4 GHz uplink, 7.2–7.6 GHz downlink) is allowed. The diplexer makes possible simultaneous transmission and reception through a single reconfigurable antenna array with relatively high isolation, typically on the order of 50 dB between the Rx and Tx channels.

BRIEF DESCRIPTION OF THE DRAWINGS

A complete understanding of the present invention may be obtained by reference to the accompanying drawing, when considered in conjunction with the subsequent detailed description, in which:

THE FIGURE is a schematic, plan view of the reconfigurable diplexer constructed in accordance with one embodiment of the present invention.

DESCRIPTION OF THE PREFERRED EMBODIMENT

A balun can be integrated with a reconfigurable diplexer so as to allow full duplex operation in one or more of a number of selectable bands. This functionality is particularly useful in the field of communications where it is highly desirable to utilize a single antenna array for operation in more than one predefined frequency band. For example, communications satellites operate in at least two bands, one for uplink and one for downlink.

The inventive diplexer uses the concept of a very wide bandwidth slot-line balun. These devices are well known to those skilled in the art, typically being used to feet slots, dipoles or exponentially tapered (Vivaldi) slots. These slot-line baluns are typically operable at frequency ratios of 5:1 or higher.

Referring now to THE FIGURE, there is shown a schematic, plan view of a diplexer 100. Diplexer 100 may be formed on a printed circuit board 101 or other suitable dielectric having a layer of copper 102, or other electrically conductive metal, deposited on one surface thereof.

Diplexer 100 generally includes a transmit (Tx) port 104; a receive (Rx) port 106; micro-stripline transmission lines 107, 109; slot-line transmission lines 108, 110; tunable, slot-line resonant cavities 112, 114; and a common slot-line transmission line 124.

Diplexer 100 is equipped with a transmit (Tx) port 104 and a receive (Rx) port 106. While a Tx port 104 and an Rx port 106 have been shown for purposes of disclosure, the invention is not limited to this configuration. For example, in alternate embodiments, ports 104, 106 could both be Tx or Rx ports. Each port 104, 106 converts a coaxial transmission line into a micro-stripline 107, 109, which excites a slot-line transmission line 108, 110, respectively. Micro-striplines 107, 109 are formed on the reverse side 103 of printed circuit board 101. Their proximity to the slot-line transmission lines 108, 110 on the front side of circuit board 101 forms a slot-line balun which causes electromagnetic coupling of signals therebetween in a manner well known in the art. Transmission lines 108, 110 are each terminated in a bulbous slot which provides the balun with a wide bandwidth. The present invention is not limited to this particular type of slot-line balun as the actual construction can vary in accordance with the construction of transmission lines 108, 110.

Disposed adjacently to transmission lines 108, 110 and operatively connected thereto, is a series of etched slot-line resonant cavities 112, 114 respectively. Each of the slot-line cavities 112, 114 has a plurality of switches 116, 118, respectively, connected across the cavity slot at predetermined points along the length of those cavity slots. Closing any of the switches shorts out the respective slot and thereby changes the electrical length of that slot for resonance purposes. Switches 116, 118 may be constructed from any suitable device such as PIN diodes or microelectromechanical switches (MEMS). Switches 116, 118 may be activated by any suitable means such as optical fibers 120 or by insulated electrical control lines affixed to the copper layer 102. The slot-line construction of diplexer 102 allows the use of electrical control lines for switches 116, 118, because the copper layer 102 helps to shield and isolate those control lines from stray electromagnetic signals.

Slot-line transmission lines 108, 110 are nominally coupled to a common slot-line transmission line 124 at a junction 122. Although transmission lines 108, 110 are shown as coupled at the same proximal end of common transmission line 124, they may in fact be coupled at different points as well as at intermediate points along transmission line 124. Likewise, more than just two transmission lines 108, 110 may be coupled to common transmission line 124, thereby forming a multiplexer. Transmission line 124 is adapted for connection to an appropriate balanced antenna element (not shown) at a terminus 126. An example of such antennas would be dipole elements connected to the copper layer 102 on either side of the transmission line terminus 126. Likewise, the same connection could be made to opposite sides of a Vivaldi notch. Balanced antenna elements are well known to those skilled in the microwave communications arts and form no part of the instant invention.

Functionally, diplexer 100 works by tuning the lengths of resonant cavities 112, 114 to control the impedance characteristics of the respective transmission lines 108, 110 with respect to frequency or wavelength. The respective lengths of resonant cavities 112, 114 are measured from the junction 122, or from the point of coupling of the respective transmission line 108, 110 to the common transmission line 124. For frequencies at which this electrical distance, respective of slot line impedance, equals one half of the wavelength, the respective transmission line 108, 110 at junction 122 appears as a short circuit and signals of that frequency are not coupled into that respective transmission line 108, 110. The multiple resonant cavities 112, 114 coupled to each transmission line 108, 110 work in combination to form a multi-pole comb filter for each respective transmission line 108, 110 and thereby cover a broad frequency band. In this manner, the resonant cavities incrementally cover a frequency band to reject all frequencies, but to selectively allow coupling of narrow band frequencies of interest. This broad frequency operability allows each slot-line to be not only selectively tunable, but even reconfigurable, to function in an entirely different frequency band.

In operation, a Tx signal 130 for uplinking is applied to Tx port 104, and Rx port 106 is connected to a receiver tuned to a frequency band which is different form the Tx signal 130. A received signal 128 enters balanced transmission line 124 of diplexer 100 and is conducted along transmission line 124 to junction 122. The respective tuned resonant cavities make the slot line transmission line 108 appear to be shorted there across over the Rx frequency band. Transmission line 110, on the other hand, will exhibit a relatively matching impedance to the Rx signal, the bulk of which will continue along transmission line 110. Simultaneously, the Tx signal 130 propagates up transmission line 108 to common transmission line 124. At the junction 122, the receive transmission line 110 has its respective resonant cavities 114 tuned so that transmission line 110 appears as an electrical short over the frequency band used in Tx signal 130, which therefore proceeds along the common transmission line 124 unimpeded by the junction 122.

A diplexer operating in this manner can provide 50 db of separation between the Tx signal 130 and Rx signal 128 under simultaneous operation, thereby preventing the higher power Tx signal 130 from over driving a receiver connected to Rx port 106.

The inventive diplexer may be configured to operate in several different bands by configuring the resonant cavities 112, 114. Typically, selective operation in either the International Telecommunications Satellite Organization (INTELSAT) frequencies (13.5–14.5 GHz uplink, 11.7–12.5 GHz downlink) or Defense Satellite Communication System (DSCS) frequencies (7.8–8.4 GHz uplink, 7.2–7.6 GHz downlink) is allowed.

Although shown as a printed circuit board, the diplexer 100 may be constructed of any electrically equivalent materials. Use of diplexer 100 at microwave frequencies such as 60 GHz. will require the use of different materials and dimensions because of the much shorter wavelengths at those frequencies. For example, diplexer 100 could be formed on a suspended thin membrane to suppress dielectric substrate losses. Experimental Qs of over 500 have been obtained using this configuration. Suspended strip-lines are appropriate for applications at C-band and higher, typically up to W-band where dimensions of the lines are compatible with typical dimensions of both silicon wafers and micro-machinable thin membranes.

The diplexer 100 thereby provides a cost and space efficient diplexer for use in phased antenna arrays where the diplexer is duplicated for each array element. This duplication may easily be accomplished with the present embodiment by forming multiple slot-line diplexers on the same printed circuit board and copper layer, as that copper layer provides inherent isolation between separate diplexers. Such multiple diplexers may then be easily assembled to a respective array of elements likewise formed on a complementary single structure. Coincidentally, the bank of multiple diplexers may provide structural support for the antenna array elements.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A diplexer for coupling transmission signals to and from a single transmission line, comprising:
    a common, slot-line transmission line adapted to carry electromagnetic signals;
    a pair a separate slot-line transmission lines coupled to the common transmission line;
    each separate slot-line transmission line having an individual filter coupled thereto, wherein each filter is adapted to selectively give its respective separate slot-line transmission line a characteristic impedance dependent upon predetermined frequencies of the electromagnetic signals; and
    a separate slot-line balun associated with each separate slot line transmission line and adapted for coupling signals to and/or from its respective separate slot-line transmission line.

2. The diplexer of claim 1, wherein each individual filter includes one or more tunable resonant slot-line cavities.

3. The diplexer of claim 2, wherein the resonant slot-line cavities are individually tunable by one or more separate switches at predetermined locations along the resonant slot-line cavities and selectively connectable across the respective cavities to determine the electrical length of the respective cavities.

4. The diplexer of claim 3, wherein the separate slot-line transmission lines are each coupled to the common slot-line transmission line at a respective coupling point and further wherein the electrical length of the respective cavities is determined with reference to the respective coupling points.

5. The diplexer of claim 2, wherein each individual filter includes a multiplicity of resonant slot-line cavities which each affect the characteristic impedance of the respective separate slot-line transmission line incrementally over a limited bandwidth and collectively over a combined broader bandwidth.

6. The diplexer of claim 1, wherein the common slot-line transmission line is adapted for coupling to an antenna element and further wherein the separate slot-line transmission lines are adapted to function as transmit and receive transmission lines, respectively.

7. The diplexer of claim 6, wherein said diplexer is adapted for satellite communication service and coupling an uplink frequency over the transmit transmission line and a downlink frequency over the receive transmission line.

8. The diplexer of claim 7, wherein said diplexer is adapted for selectable service in at least the defined INTELSAT and DSCS frequency bands.

9. The diplexer of claim 8, wherein said uplink frequency lies in one of the frequency bands: 7.8–8.4 GHz and 13.5–14.5 GHz, and said diplexer is electrically switchable therebetween.

10. The diplexer of claim 9, wherein said downlink frequency lies in one of the frequency bands: 7.2–7.6 GHz and 11.7–12.5 GHz, and said diplexer is electrically switchable therebetween.

11. The diplexer of claim 7, wherein said diplexer is adapted to maintain approximately a 50 dB channel separation between signals in transmit and receive transmission lines.

* * * * *